(12) United States Patent
Banerjee et al.

(10) Patent No.: US 10,803,234 B2
(45) Date of Patent: Oct. 13, 2020

(54) DOCUMENT PROCESSING AND NOTIFICATION SYSTEM

(71) Applicant: SAP SE, Walldorf (DE)

(72) Inventors: Debashis Banerjee, Bengaluru (IN); Shruthi Jinadatta, Bangalore (IN); Prasanna Kumar Govindappa, Bangalore (IN); Krishna Hindhupur Vijay Sudheendra, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/925,961

(22) Filed: Mar. 20, 2018

(65) Prior Publication Data

US 2019/0294658 A1 Sep. 26, 2019

(51) Int. Cl.
*G06F 40/166* (2020.01)
*G06F 9/451* (2018.01)
*G06F 16/93* (2019.01)
*G06T 11/20* (2006.01)

(52) U.S. Cl.
CPC ............ *G06F 40/166* (2020.01); *G06F 9/451* (2018.02); *G06F 16/93* (2019.01); *G06T 11/206* (2013.01)

(58) Field of Classification Search
CPC ............... G06F 17/2785; G06F 16/367; G06F 17/2725; G06F 40/166; G06F 9/451; G06F 16/93; G06F 11/206
See application file for complete search history.

(56) References Cited

U.S. PATENT DOCUMENTS

| | | | | |
|---|---|---|---|---|
| 7,505,989 B2* | 3/2009 | Gardner | ................ | G06F 16/367 |
| 8,972,240 B2* | 3/2015 | Brockett | ............. | G06F 17/2229 704/9 |
| 9,582,503 B2* | 2/2017 | Hurst | .................... | G06F 17/241 |
| 2005/0289446 A1* | 12/2005 | Moncsko | ............ | G06F 16/9558 715/208 |
| 2006/0288285 A1* | 12/2006 | Lai | ...................... | G06F 17/2725 715/708 |
| 2009/0018988 A1* | 1/2009 | Abrams | ................ | G06F 16/986 |
| 2010/0074524 A1* | 3/2010 | Stollman | ............... | G06F 16/972 382/175 |

(Continued)

*Primary Examiner* — Wilson W Tsui
(74) *Attorney, Agent, or Firm* — Buckley, Maschoff & Talwalkar LLC

(57) ABSTRACT

A method and system including a data storage device to store document files, entity graph data structures, and data graph data structures; a processor to receive input values for parameters of a plurality of entities related to a document being authored; generate an entity graph data structure linking, directly or indirectly, the plurality of entities based on shared property commonalities between the plurality of entities; generate a data graph data structure based on the entity graph data structure and at least one of at least one existing document file, curated document terms, and relevant terms acceptable to the plurality of entities; and automatically generate, based on the data graph data structure, a self-awareness notification for the document being authored, the self-awareness notification indicating an action related to a continued authoring of the document being authored; and an output to output a user interface to display the generated notification in a notification interface area of a user interface.

18 Claims, 8 Drawing Sheets

(56) References Cited

U.S. PATENT DOCUMENTS

| | | | |
|---|---|---|---|
| 2011/0131244 A1* | 6/2011 | Padovitz | G06F 16/367 |
| | | | 707/776 |
| 2011/0191369 A1* | 8/2011 | Mehra | G06F 16/94 |
| | | | 707/769 |
| 2013/0268852 A1* | 10/2013 | Hewett | G06F 17/248 |
| | | | 715/256 |
| 2015/0220497 A1* | 8/2015 | Kutilek | G06F 16/94 |
| | | | 715/208 |
| 2017/0109335 A1* | 4/2017 | Lee | G06F 40/279 |
| 2018/0060306 A1* | 3/2018 | Starostin | G06F 17/271 |
| 2019/0042556 A1* | 2/2019 | Anders | G06F 17/274 |

* cited by examiner

DOCUMENT PROCESSING AND NOTIFICATION SYSTEM

BACKGROUND

The present disclosure herein generally relates to automated document authoring and, more particularly, to systems and methods associated with authoring documents specifying multiple entities and generating notifications related thereto.

DETAILED DESCRIPTION

The following description is provided to enable any person in the art to make and use the described embodiments. Various modifications, however, will remain readily apparent to those in the art.

In some aspects of the present disclosure, one embodiment includes a method to automatically generate a document. In some instances, the document being authored might be a self-aware contract document. As used herein, a self-aware contract document includes a contract defining rights, terms, and obligations between at least two entities, where at least some of the terms and clauses comprising the document are authored based on a knowledge (i.e., cognition) of the entities and other relevant aspects of the document itself. In some embodiments, the authoring or creation of a document (e.g., a contract) between the entities may be accomplished by a system, process, service, apparatus, and/or combinations thereof including cognitive technologies. In general, cognitive technologies are able to learn or otherwise determine some aspect(s) of knowledge from data. In some aspects, innovations of the present disclosure can use cognitive technologies to generate and determine quality knowledge regarding contracting entities, in a timely and efficient manner. The learning of high quality knowledge regarding documents being authored in a timely and efficient manner by a system, process, service, apparatus, and/or combinations thereof herein can provide technological advantages. In some embodiments, the technological advantages might include the automated creation of documents that include terms and clauses that are fully compliant with relevant laws, regulations, and policies of the entities that might be specified in the document. The policies relevant to the entities may include agreements and preferences based on one or more moral bases.

Figure 1:
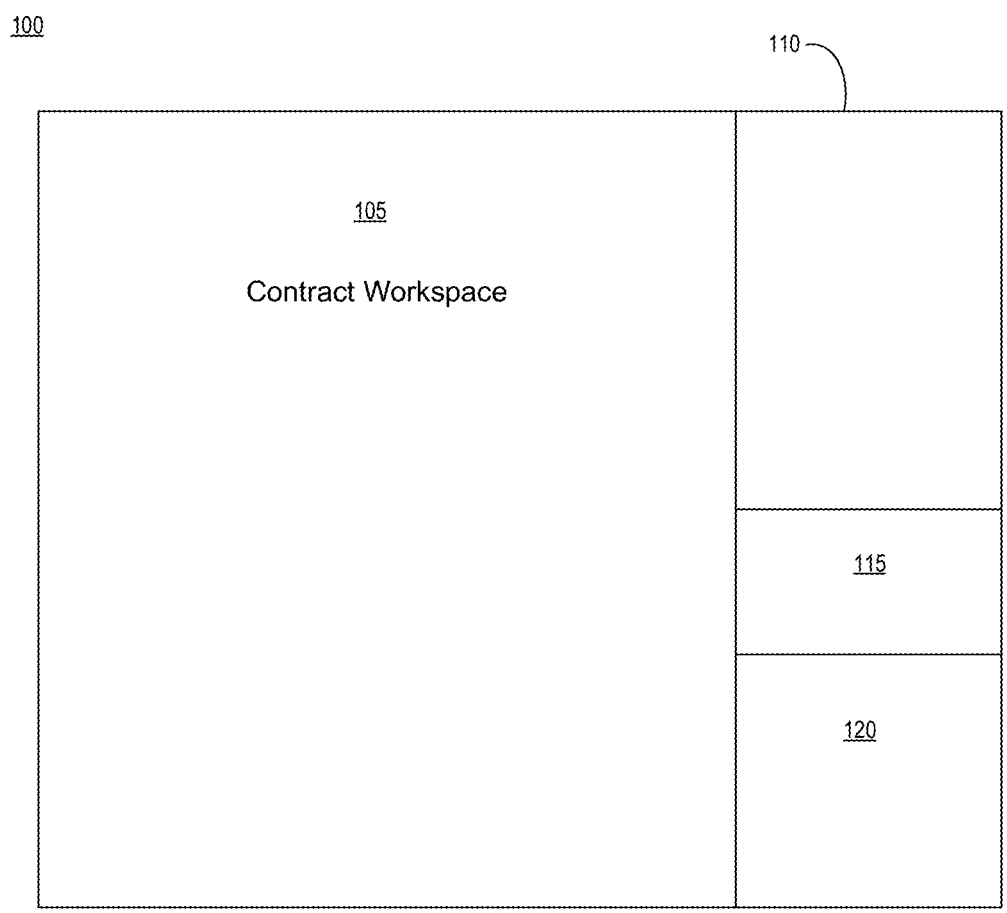
FIG. 1 is an example of an outward view of a user interface including some aspects of some embodiments.

FIG. 1 is an example embodiment of an outward view of a user interface 100, as displayed on a display device (not shown). In some embodiments, user interface (UI) 100 is not limited to being presented on any particular type or size of display device. In some aspects, the size and/or rendering of UI 100 may be modified depending, at least in part, on the display device presenting UI 100. As an example, UI 100 may be enlarged or reduced in sized depending on the size, display characteristics, and orientation of a display device to present UI 100. UI 100 might therefore be presented on a display device including a desktop monitor, a mobile telephone, a laptop computer, a tablet computing device, a wearable device (e.g., a smartwatch), a virtual reality (VR) rendering, and a projected display.

As illustrated in FIG. 1, UI 100 includes a workspace 105 where one or more documents, including subparts of the documents, can be displayed for viewing by a user. Documents displayed in workspace 105 may include presentations of structured and unstructured text data comprising a document, including but not limited to text formatted according to a word processing application or service, a markup language (e.g., Hypertext Markup Language, HTML), and other file formats (e.g., Adobe Portable Document Format (pdf) invented by Adobe). As an example, workspace 105 may include the clauses, terms, tasks and obligations defining and forming a document specifying the rights of the parties or entities of the document.

In addition to workspace 105, UI 100 further includes an interface pane 110 that is adjacent to workspace 105. Interface pane 110 may include one or more sections. In the embodiment of FIG. 1, interface pane 110 includes a conversation interface area 115 and a notification interface area 120. As shown in FIG. 1, conversation interface area 115 and a notification interface area 120 may be delineated by graphical elements (e.g., a horizontal line). However, in some embodiments conversation interface area 115 and a notification interface area 120 may share a common user interface pane without any separation therebetween. Conversation interface area 115 may support an interactive exchange of information between a system, device, or service supporting the creation or authoring of a document and a user. A document or parts thereof, in text form, may be presented in conversation interface area 115 by the system, device, or service and/or a user might create and edit a document or parts thereof in conversation interface area 115. In some embodiments, a user might select a clause of a document displayed in workspace 105 and move it to conversation interface area 115 (e.g., "drag and drop" or other UI actions) where the user can edit or modify the clause during a document authoring process.

In some aspects and embodiments, notification interface area 120 may provide and support displaying or presentations of notifications to a user. In some embodiments, the notifications presented in notification interface area 120 may relate to a document being authored by a user. In some embodiments, the notifications may indicate an action related to a continued authoring to the document being authored. The notifications may particularly relate to whether a document being authored and/or one or more of the terms and clauses therein conform to an acceptable, compliant, or permissible standard. The permissible standard might relate to one or more explicit terms of the document being authored, including those defined by a specified law, regulation, or rule that are relevant to the document and an execution thereof. In some embodiments, the permissible standard may relate to a term, clause, or obligation of entities to the document being authored and has a moral basis. As used herein, a moral basis may include any self-imposed or agreed upon limitation, right, task, or obligation of an entity. In some embodiments, a moral basis for a document term or clause may not be required by law or any other controlling regulation or policy, but rather is accepted as an important or otherwise relevant condition by an entity to a document herein. In some aspects, a "moral" basis for a contract document term or clause herein may or may not correspond to an acceptable moral standard of one or more communities.

Figure 2:
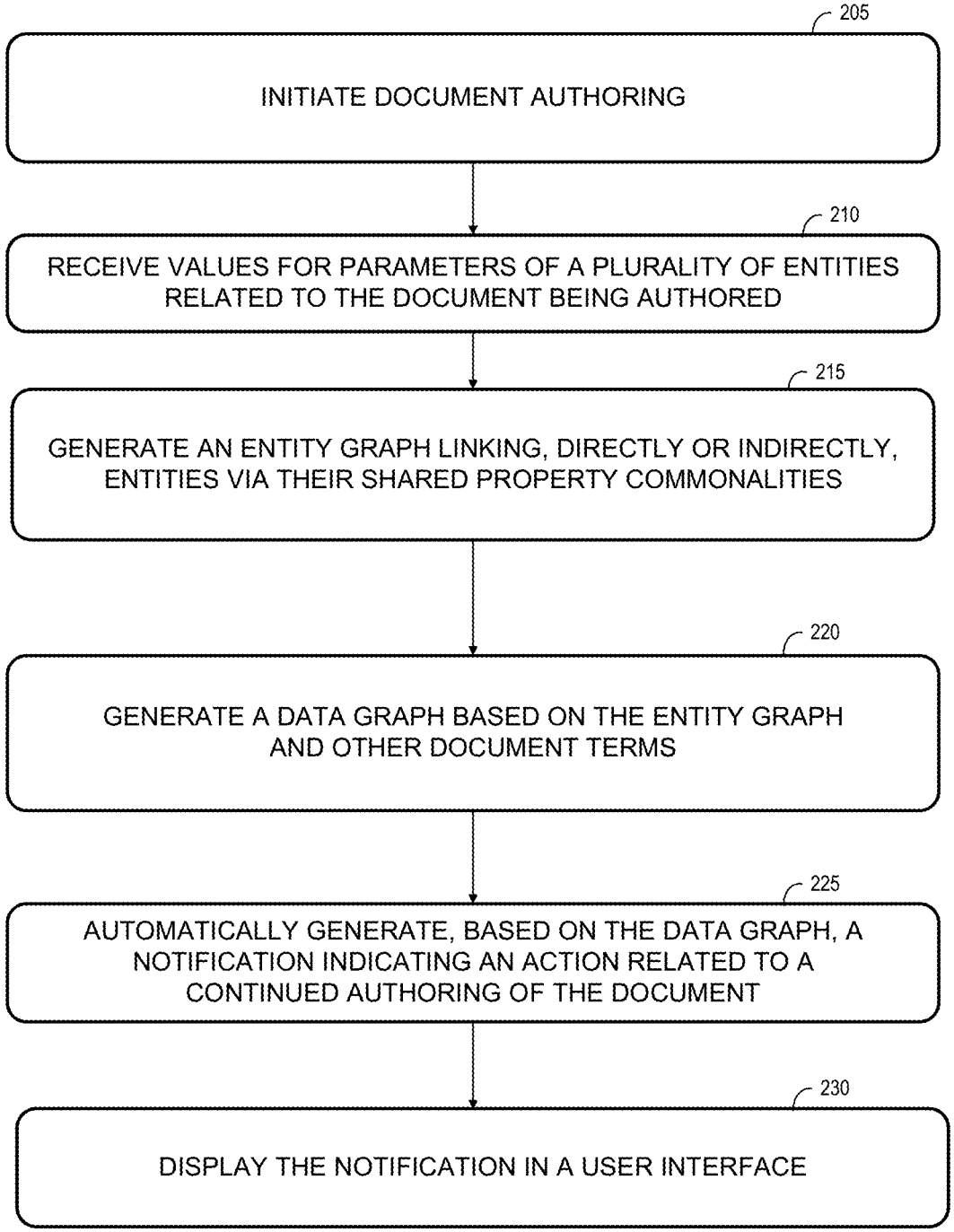
FIG. 2 is an illustrative flow diagram of a process, according to some embodiments.

In some embodiments, UI 100 may be used in a process of generating a self-aware document by a system, device, or service. FIG. 2 is an illustrative flow diagram of a process relating to some embodiments herein. At operation 205, a document authoring process is initiated. In some instances, the document being authored may be generated anew, whereas in some other instances the document being authored may use one or more existing documents as a basis for the newly created document. The existing documents may be retrieved from a data store that stores, for example, previous documents of an organization. In either instance, clauses and terms for the document being authored may be displayed in a workspace 105 of UI 100 and further edited/created in conversation interface area 115.

At operation 210, values for parameters of a plurality of entities related to the document being authored are received from a user. In some embodiments including a UI 100 as depicted in FIG. 1, the values for the entities may be received from a user by a system, service, or device via interface pane 110, including conversation interface area 115. A user might enter one or more values specifying one or more parameters of the entities related to the document being authored. In some embodiments, the user may enter one or more of the values for one or more parameters of the entities related to the document being authored and one or more of the other values for the entities that are not specified by the user might be retrieved from a data source such as, for example, a database, a social network, or a third-party source (i.e., a non-party to document being authored).

In some instances, the one or more parameters of the entities related to the document being authored may include one or more of the following: a title for the entity (e.g., contract 1, contract 2, etc.), a geographical region (e.g., continent, economic region, country, state, etc.), a date, a date range, a contract clause, a commodity type (e.g., metal), a supplier name, a supplier group name, a purchasing group name, a purchasing organization, a facility name, other parameters, and combinations thereof.

At operation 215, an entity graph data structure is generated for entities that may relate to a document being authored. The entity graph links, either directly or indirectly, the plurality of entities based on shared commonalities between the plurality of entities. For example, for the entities having values specified in operation 210, those entities having a same or equivalent value for corresponding parameters and/or a hierarchical relationship are considered to share the specific value(s). In some aspects, entities related to each other via a link of an entity graph data structure may be combined with each in a document.

Figure 3:
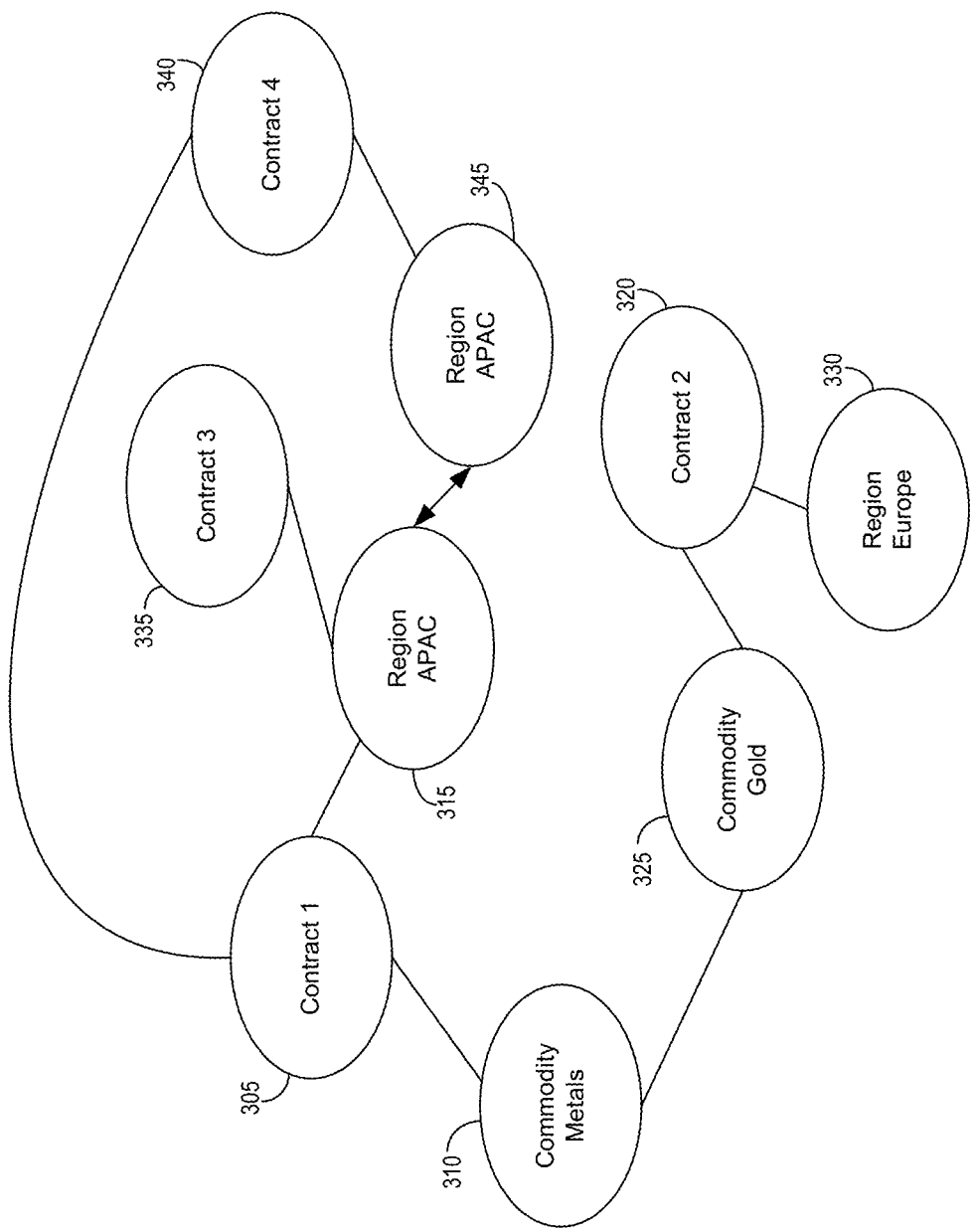
FIG. 3 is an illustrative depiction of an entity graph, according to some embodiments.

FIG. 3 is an illustrative example of an entity graph data structure 300. Entity graph data structure 300 is generated based on the values specified for the one or more parameters of the plurality of entities of a document being authored. Entity graph 300 includes entities 305 (title=contract 1), 320 (title=contract 2), 335 (title=contract 3), and 340 (title=contract 4). As shown in FIG. 3 and indicated by the lines terminating at entity 305, contract 1 has a commodity type 310 of metals and a region type 315 of APAC (i.e., Asian-Pacific). Also, contract 2 includes a commodity type 325 (gold) and a region type 330 (Europe); contract 3 includes a region type 315 (APAC); and contract 4 includes a region type 345 (APAC) and is directly related to contract 1.

Based on the links between the entities depicted in FIG. 3, it is seen that contracts 1, 3, and 4 have the same "region" value of APAC. Similarly, it is seen that contracts 1 and 2 share the same commodity type of metals, since the commodity type gold (325) of entity 320 (contract 2) is related to the commodity type metal (410) of entity 405 (contract 1). Furthermore, based on the links between the different parameter values in the entity graph 300, contract 4 is related to contract 2 by virtue of contract 4 being related to contract 1. Accordingly, it is seen that the entity graph data structure of FIG. 3 illustrates the permissible relationships and associations between the different entities therein. In some embodiments, a path or combination of entities not linked in an entity graph data structure may not be permissible for combining in a particular document.

Returning to FIG. 2 at operation 220, a data graph data structure is generated. A data graph data structure herein relates two or more entities of a document together based on an entity graph data structure including the entities and some awareness and knowledge of the terms to be included in the document. That is, the knowledge to be considered in determining the compliance graph data structure includes an awareness of the terms, obligations, and clauses to be included in the document being authored. As such, process 200 is deemed to be a process for authoring a self-aware document.

In some embodiments, the knowledge of the terms to be included in the document being authored and considered in operation 220 may be obtained from prior or other existing documents, document authoring "best practices" clauses and terms (e.g., as determined or "curated" by an organization, an industry standards group, and other entities), and terms agreed to be relevant and acceptable to at least one of the party entities of the document being authored. In some instances, the acceptable relevant terms need only be agreed to by one of the entities to a document in order to be relevant to all other entities in the document being authored. In some embodiments, the acceptable relevant terms to the plurality of entities include terms having a moral basis for at least one of the plurality of entities. In some instances, the acceptable relevant terms to the plurality of entities include terms having a moral basis for at least one of the plurality of entities.

As an example, one moral clause to be included in a document being authored may forbid working with an entity that is a known terrorist organization and/or supports such organizations. Another moral clause may forbid working with an entity that manufactures goods using child labor and/or that pays workers less than a minimum threshold salary. Further examples of document clauses having a moral basis include a clause stipulating no software from a "banned" country and a clause mandating that all participating entities are "environmentally friendly".

Figure 4:
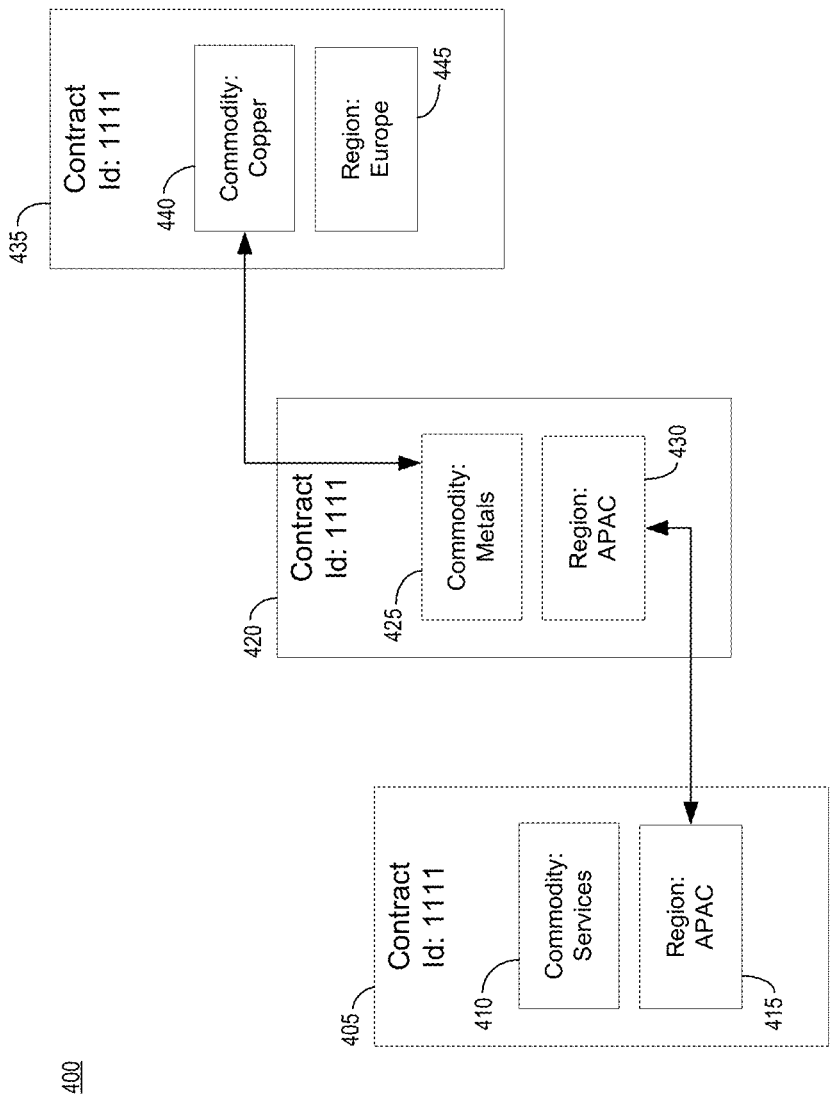
FIG. 4 is an illustrative depiction of a representative data graph database data structure, according to some embodiments.

FIG. 4 is an illustrative depiction of a data graph data structure 400 that may be stored in a graph database. In the example of FIG. 4, data graph data structure 400 is a representation of the graph structures used to represent and store the data graph data structure, including the entities 405 (i.e., contract 1111), 420 (contract 2222) and 435 (i.e., contract 3333) related to each other based on one or more different permissible associations as illustrated by the edges between the entities. As seen, contract 1111 includes a commodity type 410 and a region 415. Contract 1111 is related to contract 2222 via region 430 and contract 2222 is related to contract 3333 via its commodity 425 being associated with commodity type 440. It is noted that contract 3333 is related to contracts 2222 (directly) and 1111 (indirectly) despite region 445 of contract 3333 being unrelated to either of the other documents.

Returning to FIG. 2 and operation 225 specifically, a notification (e.g., a self-awareness notification) may be automatically generated based on the self-awareness graph data structure of operation 220. The notification generated at operation 225 is one of a plurality of possible notifications indicating an action for a continued authoring (i.e., drafting) of the document being authored. The particular notification generated at operation 225 is based on, at least in part, the knowledge and awareness included in the data graph of operation 220. In some embodiments, the notification is automatically generated at operation 225 in response to the generation of the data graph data structure of operation 220 as a user is authoring a document.

Operation 230 includes displaying the notification generated at operation 225 so that a user (or other entity, such as a system, device, apparatus, or service) might be informed of the notification. In some instances, the notification generated at operation 225 and displayed at operation 230 might impact a user's ability to continue or complete the authoring of a document. For example, the plurality of notifications for the document being authored may include one of four possibilities in some embodiments, including a warning notification, a block notification, a secret warning notification, and a secret block notification. As used herein, a warning notification indicates a term or clause being added to the document being authored is not appropriate. An example of a warning notification may be a message stating, "You cannot use this supplier as they do not have a good environmental record and you are a responsible green citizen". A block notification herein informs and prevents a user from completing an authoring of the document based on an impermissible combination of at least one of the plurality of entities and a term or clause being added to the document being authored. For example, "You are choosing a set of entities and terms that in combination could be used to build an explosive—we do not allow this. Please seek approval from a supervisor to proceed!" In some aspects, a secret warning notification herein informs an administrative entity (e.g., law enforcement officer or agency, organizational manager, etc.) of a warning regarding the document being authored, without notifying the user of the secret warning notification. For example, this type of notification may send a message or other warning notification to an administrative or law enforcement authority in the background unbeknownst and without indication to the user that the user is attempting to create a document that procures explosives or that the user is attempting to work with a known criminal, and other forbidden practices. The secret warning notification does not prevent a user from continuing to author the document. A secret block notification informs an administrative entity (e.g., law enforcement officer or agency, organizational manager, etc.) of a warning regarding the document being authored, without notifying the user of the secret block notification, and further prevents a user from completing an authoring of the document. Such a notification might state, "We apologize but that supplier is not available" or "We apologize but the system is down", while simultaneously preventing the user from completing the authoring of the document and informing the appropriate administrative entity.

In some embodiments, a data graph data structure generated in accordance with aspects of the present disclosure may be used by a system, service, apparatus, and combinations thereof to automatically suggest, recommend, or generate a clause for inclusion in a document being authored to include permissible combinations of entities and acceptable relevant terms to the plurality of entities comprising the document. Since a data graph data structure indicates or otherwise specifies path(s) including a combination of permissible combinations of entities and acceptable relevant terms to the plurality of entities comprising the document, a system, service, or apparatus may use the information specified in the data graph data structure to automatically suggest, recommend, or draft one or more document clauses that includes one or more entities specified in a path specified in a data graph and one or more acceptable terms, clauses, or obligations associated with those entities. In some embodiments, the at least one document clause to be included in the document being authored comprises a combination of at least one document term or obligation having a moral basis for at least one of the plurality of entities and at least one of the plurality of entities.

Accordingly, a process and system herein may automatically suggest, recommend, or generate a document clause that can leverage the self-awareness included in the knowledge conveyed in a data graph data structure herein.

Figure 5:
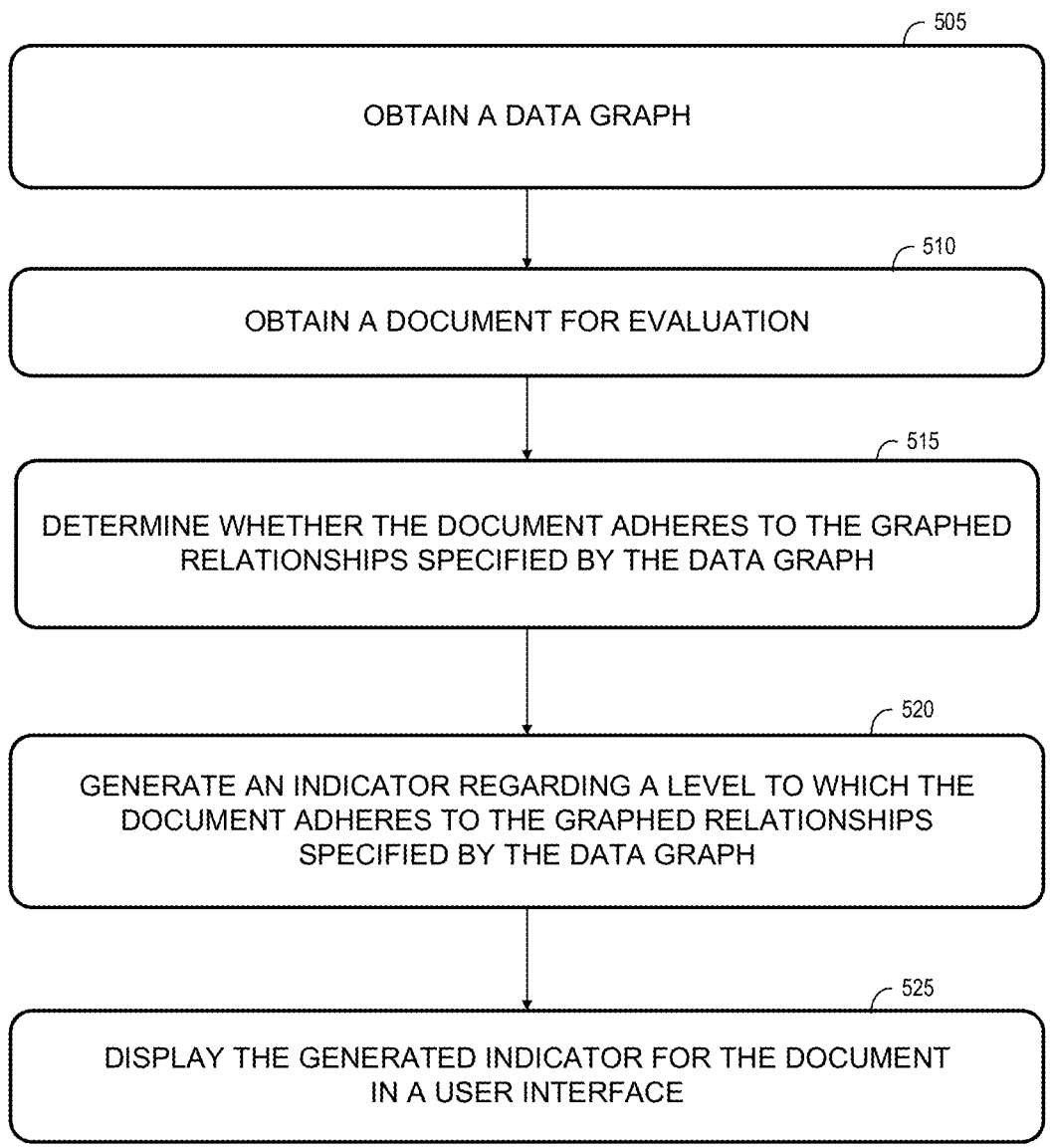
FIG. 5 is an illustrative flow diagram of another process, according to some embodiments.

FIG. 5 is an illustrative example of a process 500 to evaluate a contract document, in accordance with some embodiments herein. At operation 505, a data graph is obtained. According to some aspects herein, the data graph may be retrieved from a graph database.

At operation 510, a document for which an evaluation is desired regarding its adherence (or non-adherence) to a data graph data structure is obtained. In some aspects, the document or part of a document obtained at operation 510 may be retrieved from a data source such as a database, a memory, or a data stream.

At operation 515, the data graph data structure is applied to the document by a system, device, or service to determine whether the document adheres to the graphed relationships specified in the data graph data structure. Application of the data graph data structure to the document includes, as shown at operation 520, generating an indicator (e.g., a score, percentage, or other measure) for the obtained document relative to the data graph data structure. For example, an indication of a "score" of 90% for a document or document sub-part may indicate that the document or document sub-part(s) are 90% compliant with the data graph data structure applied to the document or document part(s)/clause(s).

At operation 525, the indicator generated at operation 520 may be presented to a user. In some embodiments, the indicator may be presented to a user in a user interface such as, for example, interface pane 110 of UI 100 of FIG. 1. In some embodiments, the indicator may be presented to a user in a notification interface area 120 of UI 100. In some embodiments, the indicator may be accompanied by an indication of the portion or portions (e.g., clauses and/or terms) of the document being evaluated for adherence that do not comply with the data graph. In some embodiments, the offensive portion or portions of the document may be presented to a user in a conversation interface area 115 of UI 100 or highlighted in-line in the workspace 105.

Figure 6:
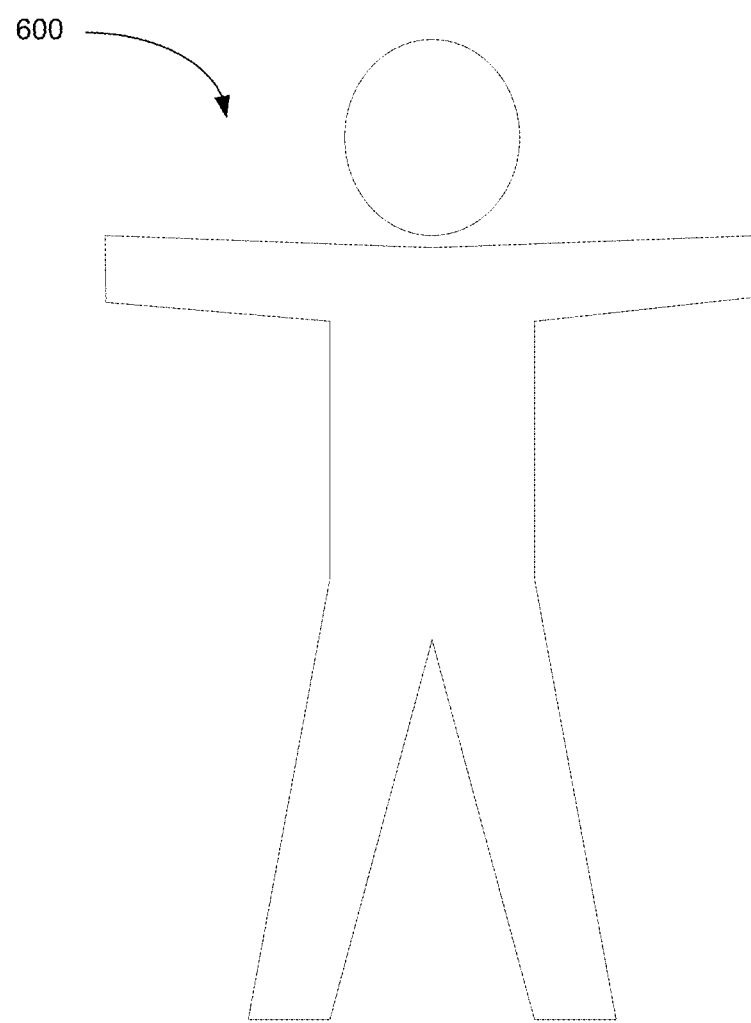
FIG. 6 is an illustrative depiction of a personification of some aspects of a contract, according to some embodiments.

In some embodiments, a document authored in accordance with some aspects herein may be personified with human characteristics. For example, one or more aspects of a document may be equated to a human characteristic. In one embodiment, portions of a document might be associated with, for example, "sight", "smell", "strength", "speed and agility", and other senses or capabilities of a human ("thinking", "studying", etc.). FIG. 6 is an illustrative graphic depiction of a human 600, where different parts of the human 600 may be associated with different types of document clauses and/or portions of a document. In some embodiments, a user may interact with a graphical representation of a human body such as human graphic 600 via a UI and various devices.

In some embodiments, a UI such as UI 100 of FIG. 1 may prompt a user to provide an input of what the user wants a document to include or how it should perform. In some embodiments, the user may be prompted to enter a reply via conversation area 115. However, in reply to such a prompt, the user may provide a "human" characteristic(s) instead of an explicit document clause or task. For example, the user may reply with "run", "sleep and rest", "feel safe", "build muscle", and other such phrases that can be associated with a body, capability, and senses of a human. As an example, a user input of a "human" characteristic can be transformed to a document clause corresponding to the user input by a system, service, or device herein. In accordance with some aspects herein, the document clause(s) corresponding to a "human" characteristic may be stored in a data graph data structure in a graph database or other databases, in accordance with some embodiments herein.

In some embodiments, a user input of "run" may be translated to refer to a document clause specifying a supplier to act on an accelerated schedule (i.e., act faster). A user input of "build muscle" may translate and refer to a document clause to include increased assurances in the document between specified entities. A user input of "feel safe" may refer to and generate a document clause that specifies greater safeguards against a potential loss (i.e., limit risk to a buyer). A user input of "sleep and rest" may refer to and generate a document clause that specifies a slower delivery schedule. Other document clauses and terms might be generated in a similar manner for other "human" characteristics. In some embodiments, a lookup table, other data structure, or other mapping mechanism may be used to implement a transformation from a user input of a "human" characteristic to a document clause.

In some embodiments, a user may interact with a system, device, or apparatus by interacting with a graphic element representative of a human such as, for example, human graphic 600 to enter a user input indicative of "human" characteristic the user would like to include in a document being authored. In some embodiments, the human graphic may be included in a user interface presented to a user, such as, for example, UI 100 of FIG. 1. In one embodiment, a user might select an arm of the human graphic 600 to indicate that the user would like the document being drafted to be "stronger" and/or to "add muscle" to the document (e.g., the includes enhanced protections for a buyer or other entity). In a similar manner, selecting a leg of the human graphic might indicate the user wants to include a clause or section in the document that makes performance of the document's tasks "faster" (i.e., the timeline for completing the tasks in the document are accelerated and/or incentivized for faster completion of the specified tasks in the document). Other "human" characteristics might be indicated by a user selecting other portions or sections of the human graphic 600 (e.g., head/brain, mouth, hand, etc.). In some embodiments, user input via human graphic 600 may be used in conjunction with a textual input mechanism such as, for example, a conversation interface area 115 of UI 100, as shown in FIG. 1.

Figure 7:
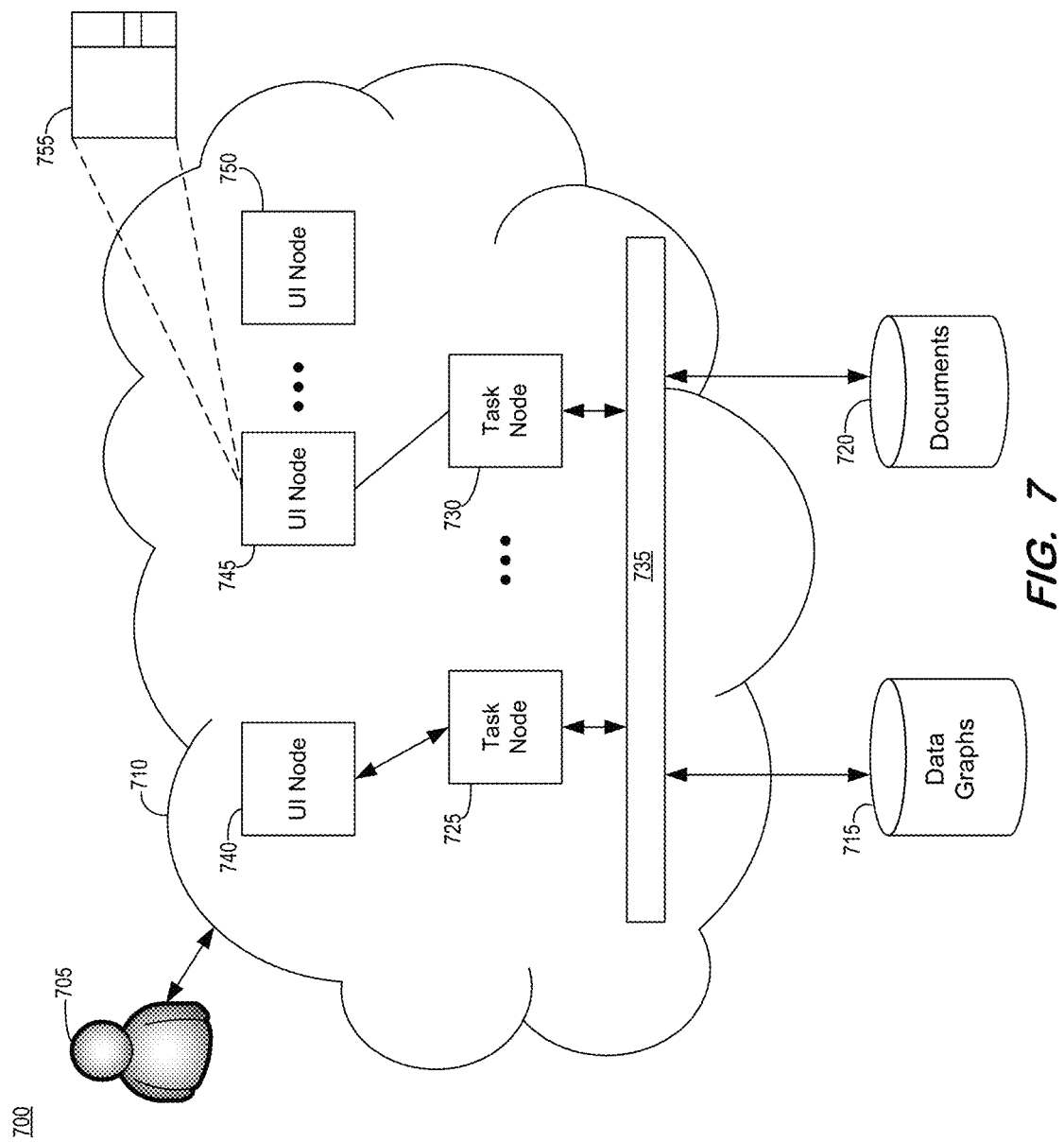
FIG. 7 is an illustrative example of system, according to some embodiments.

FIG. 7 is a block diagram of a document authoring system 700 that supports and provides technological mechanisms to create or author a document including, for example, cognitive agreement compliance. User 705 may access document authoring system 700 via a cloud service 710. Document authoring system 700 includes a graphic database 715 that stores graphic files such as graphic data structures that can be queried. In accordance with aspects herein, database 715 stores data graph data structures. Document authoring system 700 includes a document database 720 that stores documents. The documents stored in document database 720 may include prior existing documents previously drafted by or otherwise related to an organization or provided by a third-party source. In some embodiments, document database 720 might be a relational database, which may be centralized or configured as multiple nodes. Document authoring service 710 may include a network interface or gateway layer 735 to facilitate communication between graphic database 715 and document database 720 and the document authoring service 710. Document authoring service 710 includes one or more processing or task nodes 725 and 730 that individually and/or cooperatively execute tasks associated with authoring documents including, in some instances or embodiments, self-aware terms, as disclosed in some aspects herein. User 705 may access service 710 using various devices, such as for example, computers (not shown) and mobile devices (not shown), where a user interface 755 is displayed on the user's device and generated by one or more UI nodes 740, 745, and 750, depending on the particular task(s) being executed. In some embodiments, user 705 may include an administrative entity such as, for example, a manager or supervisor of an organization, a law enforcement officer, and other entities.

Figure 8:
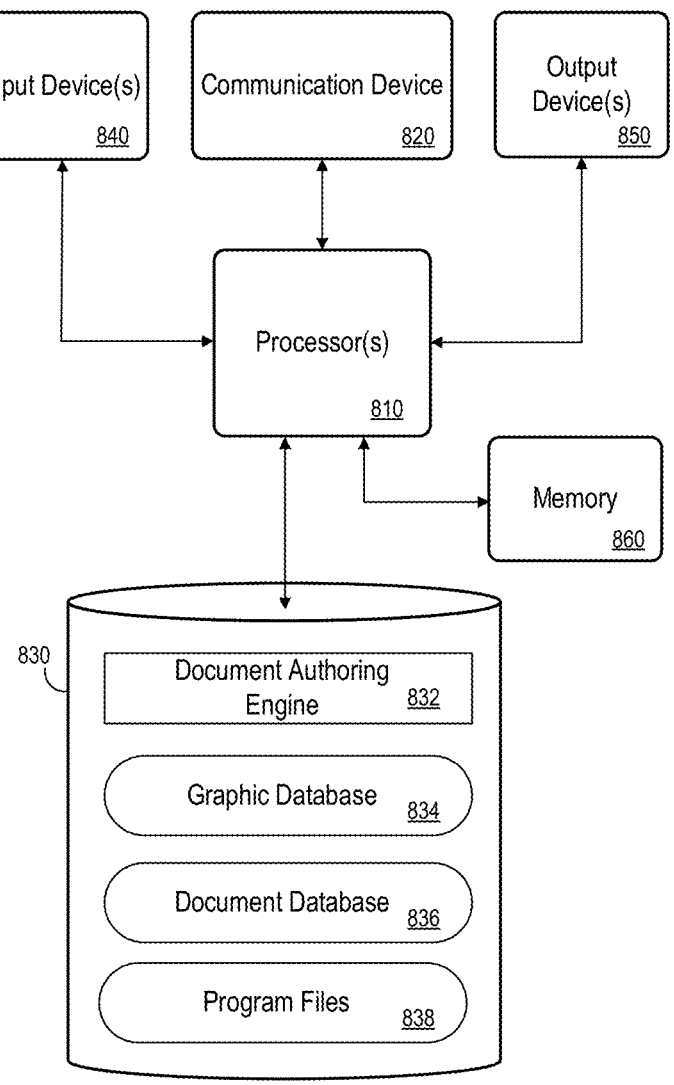
FIG. 8 is a block diagram of an apparatus, according to some embodiments.

FIG. 8 is a block diagram of computing system 800 according to some embodiments. System 800 may comprise a general-purpose or special-purpose computing apparatus and may execute program code to perform any of the methods, operations, and functions described herein. System 800 may comprise an implementation of one or more elements of UI 100 and system 600. System 800 may include other elements that are not shown, according to some embodiments.

System 800 includes processor(s) 810 operatively coupled to communication device 820, data storage device 830, one or more input devices 840, one or more output devices 850, and memory 860. Communication device 820 may facilitate communication with external devices, such as a data server. Input device(s) 840 may comprise, for example, a keyboard, a keypad, a mouse or other pointing device, a microphone, knob or a switch, an infra-red (IR) port, a docking station, and/or a touch screen. Input device (s) 840 may be used, for example, to enter information into system 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM), Storage Class Memory (SCM) or any other fast-access memory.

Document authoring engine 832 may comprise program code executed by processor(s) 810 (and within the execution engine) to cause system 800 to perform any one or more of the processes described herein (e.g., processes 300 and 500). Embodiments are not limited to execution by a single apparatus. Graphic database 834 may comprise data graph data structures, according to some embodiments. Data storage device 830 may also store documents in document database 836, as well as data and other program code 838 for providing additional functionality and/or which are necessary for operation of system 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a data storage device to store document files, entity graph data structures, and data graph data structures;
a processor to receive input values, via one or more user inputs, for parameters of a plurality of entities related to a document being authored, each of the parameters being indicative of at least one characteristic of at least one corresponding entity; and, in response to receipt of the input values via the one or more user inputs:
generate an entity graph data structure linking, directly or indirectly, the plurality of entities based on shared parameter value commonalities between the plurality of entities;
generate a data graph data structure relating two or more entities of the document together based on the entity graph data structure and at least one of at least one existing document file, curated document terms, and relevant terms acceptable to the plurality of entities;
automatically generate, based on the data graph data structure, a self-awareness notification for the document being authored, the notification indicating an action related to a continued authoring of the document being authored, wherein the notification comprises a blocking notification to notify a user that an impermissible combination of document terms has been input by the user, the impermissible combination being identified based on a relationship between the entities included within the graph data structure; and
inhibiting the user from further authoring the document in response to the generation of the blocking notification; and
an output to output a user interface to display the generated notification in a notification interface area of a user interface.

2. The system of claim 1, wherein the generated entity graph data structure comprises graphical links that indicate permissible combinations of the pluralities of entities in the document being authored.

3. The system of claim 1, wherein the processor further executes a data extraction process on an existing document file.

4. The system of claim 1, wherein the generated self-awareness notification for the document being authored is at least one of:
a first notification that a term being added to the document is not acceptable, where authoring of the document can continue;
a second notification that informs and prevents a continued authoring of the document based on an impermissible combination of at least one of the plurality of entities and a term being added to the document;
a third notification that informs an entity regarding the document, without notifying a user of the third notification, where authoring of document can continue; and
a fourth notification that informs a first entity of the document, without notifying a user of the fourth notification, and further prevents a continued authoring of the document.

5. The system of claim 1, wherein the processor is further operative to automatically generate, based on the data graph data structure, at least one document term to be included in the document being authored.

6. The system of claim 1, wherein the processor is further operative to:
receive a first document file and a data graph file from the data storage device, the document file comprising a plurality of textual terms associating a plurality of entities to each other and the data graph file graphically relating entities specified in a document file to terms specified to be included in the document file including the specified entities;
determine whether the first document file adheres to the graphed relationships specified by the data graph file;
generate an indicator for the first document that indicates a level to which the first document adheres to the graphed relationships specified by the data graph file; and
output a user interface displaying the generated indicator for the first document.

7. A non-transitory computer readable medium having executable instructions stored therein, the medium comprising:
instructions to receive input values, via one or more user inputs, for parameters of a plurality of entities related to a document being authored, each of the parameters being indicative of at least one characteristic of at least one corresponding entity; the instructions to, responsive to receipt of the input values via the one or more user inputs:

generate an entity graph data structure linking, directly or indirectly, the plurality of entities based on shared parameter value commonalities between the plurality of entities;

generate a data graph data structure relating two or more entities of the document together based on the entity graph data structure and at least one of at least one existing document file, curated document terms, and relevant terms acceptable to the plurality of entities;

automatically generate, based on the data graph data structure, a self-awareness notification for the document being authored, the self-awareness notification indicating an action related to a continued authoring of the document being authored, wherein the notification comprises a blocking notification to notify a user that an impermissible combination of document terms has been input by the user, the impermissible combination being identified based on a relationship between the entities included within the graph data structure;

output to a user interface to display the generated notification in a notification interface area of a user interface; and inhibit the user from further authoring the document in response to the generation of the blocking notification.

8. The medium of claim 7, wherein the generated entity graph data structure comprises graphical links that indicate impermissible combinations of the pluralities of entities in the document being authored.

9. The medium of claim 7, wherein the processor further executes a data extraction process on an existing document file.

10. The medium of claim 7, wherein the generated self-awareness notification for the document being authored is at least one of:

a first notification that a term being added to the document is not acceptable, where authoring of the document can continue;

a second notification that informs and prevents a continued authoring of the document based on an impermissible combination of at least one of the plurality of entities and a term being added to the document;

a third notification that informs an entity regarding the document, without notifying a user of the third notification, where authoring of document can continue; and a fourth notification that informs a first entity of the document, without notifying a user of the fourth notification, and further prevents a continued authoring of the document.

11. The medium of claim 7, further comprising instructions to automatically generate, based on the data graph data structure, at least one document term to be included in the document being authored.

12. The medium of claim 7, further comprising:

instructions to receive a first document file and a data graph file from the data storage device, the document file comprising a plurality of textual terms associating a plurality of entities to each other and the data graph file graphically relating entities specified in a document file to terms specified to be included in the document file including the specified entities;

instructions to determine whether the first document file adheres to the graphed relationships specified by the data graph file;

instructions to generate an indicator for the first document that indicates a level to which the first document adheres to the graphed relationships specified by the data graph file; and instructions to output a user interface displaying the generated indicator for the first document.

13. A computer-implemented method comprising:

receiving, by a processor, a first document file and a data graph file from a data storage device, the document file comprising a plurality of textual terms associating a plurality of entities to each other and the data graph file graphically relating two or more entities specified in a document file to terms specified to be included in the document file including the specified entities;

receiving, by the processor, input values, via one or more user inputs, for parameters of a plurality of entities of a document being authored, each of the parameters being indicative of at least one characteristic of at least one corresponding entity;

determining, by the processor, whether the first document file adheres to the graphed relationships specified by the data graph file based on shared parameter value commonalities between the plurality of entities;

generating, by the processor, an indicator for the first document that indicates a level to which the first document adheres to the graphed relationships specified by the data graph file;

automatically generating, by the processor and based on the data graph file, a self-awareness notification comprises a blocking notification to notify that an impermissible combination of document terms has been input by the user, the impermissible combination being identified based on a relationship between the entities included within the graph data structure;

inhibiting, by the processor, the user from further authoring the document in response to the generation of the blocking notification; and outputting, by the processor, a user interface displaying the generated indicator for the first document.

14. The method of claim 13, wherein the processor further executes a data extraction process on an existing document file.

15. The method of claim 13, wherein the processor further automatically generates, based on the data graph data structure, at least one document term to be included in the document being authored.

16. The method of claim 15, further comprising outputting, by the processor, a user interface displaying the generated at least one document term to be included in the document being authored.

17. The method of claim 15, further comprising:

automatically generating, based on the data graph data structure, a self-awareness notification for the document being authored, the self-awareness notification indicating an action related to a continued authoring of the document being authored; and outputting to a user interface to display the generated notification in a notification interface area of a user interface.

18. The method of claim 15, wherein the generated self-awareness notification for the document being authored is at least one of:

a first notification that a term being added to the document is not acceptable, where authoring of the document can continue;

a second notification that informs and prevents a continued authoring of the document based on an impermissible combination of at least one of the plurality of entities and a term being added to the document;

a third notification that informs an entity regarding the document, without notifying a user of the third notification, where authoring of document can continue; and a fourth notification that informs a first entity of the document, without notifying a user of the fourth notification, and further prevents a continued authoring of the document.

* * * * *